United States Patent
Luo

(10) Patent No.: US 12,151,148 B2
(45) Date of Patent: Nov. 26, 2024

(54) PICKLEBALL TRAINING NET

(71) Applicant: Tri-Great International LTD., Dongguan (CN)

(72) Inventor: Chunfang Luo, Dongguan (CN)

(73) Assignee: Tri-Great International LTD., Dongguan (CN)

( * ) Notice: Subject to any disclaimer, the term of this patent is extended or adjusted under 35 U.S.C. 154(b) by 187 days.

(21) Appl. No.: 17/980,061

(22) Filed: Nov. 3, 2022

(65) Prior Publication Data

US 2024/0123310 A1 Apr. 18, 2024

(30) Foreign Application Priority Data

Oct. 14, 2022 (CN) .......................... 202222709778.2

(51) Int. Cl.
| | |
|---|---|
| *A63B 63/00* | (2006.01) |
| *A63B 61/00* | (2006.01) |
| *A63B 61/04* | (2006.01) |
| *A63B 102/08* | (2015.01) |

(52) U.S. Cl.
CPC .......... *A63B 63/007* (2013.01); *A63B 61/003* (2013.01); *A63B 61/04* (2013.01); *A63B 2102/08* (2015.10); *A63B 2225/09* (2013.01)

(58) Field of Classification Search
CPC ..... A63B 63/007; A63B 61/003; A63B 61/04; A63B 2102/08; A63B 2225/09; A63B 69/0097; A63B 2063/001; A63B 2071/0694; A63B 2210/50; Y02A 40/81
USPC ....... 473/195, 197, 383, 404, 435, 454–456, 473/469
See application file for complete search history.

(56) References Cited

U.S. PATENT DOCUMENTS

| | | | | |
|---|---|---|---|---|
| 3,427,026 | A * | 2/1969 | Mahoney ........... | A63B 69/0097 273/395 |
| 4,188,031 | A * | 2/1980 | Fox ........................ | A63B 63/00 273/354 |
| 5,333,856 | A * | 8/1994 | Gery ...................... | A63B 63/00 473/454 |
| 5,348,291 | A * | 9/1994 | Scully .................... | A63B 63/00 473/454 |
| 5,833,234 | A * | 11/1998 | Vavala ................ | A63B 69/0097 273/400 |
| 5,857,679 | A * | 1/1999 | Ringe ................. | A63B 69/0097 273/395 |
| 6,402,641 | B1 * | 6/2002 | Lee ........................ | A63B 63/00 273/127 R |

(Continued)

*Primary Examiner* — Nini F Legesse
(74) *Attorney, Agent, or Firm* — Hemisphere Law, PLLC; Zhigang Ma

(57) ABSTRACT

A pickleball training net includes: a bracket and a rebound net, a cross member is arranged in a middle of the bracket, the cross member divides the bracket to form an upper half area and a lower half area, the rebound net is arranged in the upper half area of the bracket, the bracket is provided with a number of hooks to fix the rebound net, the rebound net is provided with a identification tape, a middle section of the rebound net is divided into a rebound area by the identification tape. The pickleball training net can assist the training person to complete single person training and the pickleball training net is easy to carry, the simulation is high, the rebound effect is good, the requirement on the field is low, and the inclination angle of the bracket can be adjusted according to the need.

10 Claims, 5 Drawing Sheets

(56) References Cited

U.S. PATENT DOCUMENTS

| | | | | |
|---|---|---|---|---|
| 6,508,729 B1 * | 1/2003 | Coltrane | ............... | A63B 69/002 |
| | | | | 273/402 |
| 6,739,988 B2 * | 5/2004 | Jensen | .................... | A63B 69/38 |
| | | | | 273/396 |
| 8,590,901 B2 * | 11/2013 | Goldwitz | ............... | A63B 63/00 |
| | | | | 473/434 |

* cited by examiner

PICKLEBALL TRAINING NET

TECHNICAL FIELD

The disclosure relates to the field of pickleball training nets, and more particularly to a pickleball training net.

BACKGROUND

Pickleball is a kind of sport that hits a ball with a racket. The conventional pickleball requires a high level of sporting field and needs to cooperate with players to train. For those who like pickleball, it is more troublesome to carry out daily training.

SUMMARY

In order to overcome the above shortcoming, the disclosure aims to provide a technical solution that can solve the above problem.

A pickleball training net, includes: a bracket and a rebound net, a cross member is arranged in a middle of the bracket, and the cross member divides the bracket to form an upper half area and a lower half area; the rebound net is arranged in the upper half area of the bracket, the bracket is provided with a plurality of hooks to fix the rebound net; and the rebound net is provided with an identification tape, a middle section of the rebound net is divided into a rebound area by the identification tape.

As one of improvements of the above technical solution, a height of the cross member is less than 910 millimeters (mm).

As one of improvements of the above technical solution, the pickleball training net further includes: a support rod, the support rod is hinged with a back of the bracket.

As one of improvements of the above technical solution, the pickleball training net further includes: a fixing rod, the fixing rod is connected between the bracket and the support rod, and the fixing rod, the bracket and the support rod form a triangular structure.

As one of improvements of the above technical solution, the fixing rod includes an adjusting section, a connecting section and an inserting section; the adjusting section and the inserting section are detachably inserted into two ends of the connecting section, respectively; the other end of the adjusting section is hinged with a top end of the bracket, and the other end of the inserting section is hinged with the support rod.

As one of improvements of the above technical solution, the connecting section is tubular, a nozzle of the connecting section is annularly provided with a plurality of gaps and is sleeved with a fastening ring, and when the adjusting section is inserted into the connecting section, the adjusting section is fixed to the connecting section by the fastening ring.

As one of improvements of the above technical solution, the support rod is provided with a first hinging base, a center of a bottom surface of the bracket is bent upwards to form a protruding portion; the protruding portion is provided with a second hinging base; and the inserting section is detachably connected with one of the first hinging base and the second hinging base.

As one of improvements of the above technical solution, the identification tape includes: an upper identification tape and a lower identification tape, the upper identification tape and the lower identification tape are arranged in parallel, and two ends of the upper identification tape and two ends of the lower identification tape are respectively connected with the bracket to define the rebound area.

As one of improvements of the above technical solution, two ends of the identification tape are bound on the bracket and a height of the identification tape is capable to be adjusted up and down along the bracket.

As one of improvements of the above technical solution, a line diameter of the rebound net is less than 1.5 mm.

Compared with the prior art, the disclosure has the following beneficial effects: The pickleball training net provided in the disclosure can assist a training person to complete single person training, the simulation is high, the rebound effect of a half-net structure is good, the requirement on the field is low, and the pickleball training net is easy to carry, and the inclination angle of the bracket can be adjusted according to the need, and the identification tape is arranged to remind the training person to accurately hit the pickleball to an optimal rebound area or a specific area, so as to improve the quality and level of playing.

Additional aspects and advantages of the disclosure will be set forth in part in the following description, and some of them will be obvious from the following description, or may be learned by practice of the disclosure.

BRIEF DESCRIPTION OF DRAWINGS

In order to more clearly explain embodiments of the disclosure or the technical solutions in the related art, the following will briefly introduce the attached drawings that need to be used in the embodiments or the description of the related art. It is obvious that the attached drawings in the following description are only some of the embodiments of the disclosure. For those skilled in the art, without paying creative labor, other drawings can also be obtained according to the structures shown in these drawings.

DESCRIPTION OF REFERENCE NUMERALS

1—bracket; 2—rebound net; 3—identification tape; 31—upper identification tape; 32—lower identification tape; 4—support rod; 5—fixing rod; 11—protruding portion; 12—cross member; 41—first hinging base; 42—second hinging base; 51—adjusting section; 52—connecting section; 53—inserting section; 521—gap.

DETAILED DESCRIPTION OF EMBODIMENTS

The technical solutions in the embodiments of the disclosure will be described clearly and completely below. Apparently, the described embodiments are only some of the embodiments of the disclosure, not all of them. Based on the embodiments of the disclosure, all other embodiments obtained by those skilled in the art without doing creative work belong to the scope of protection of the disclosure.

Figure 1:
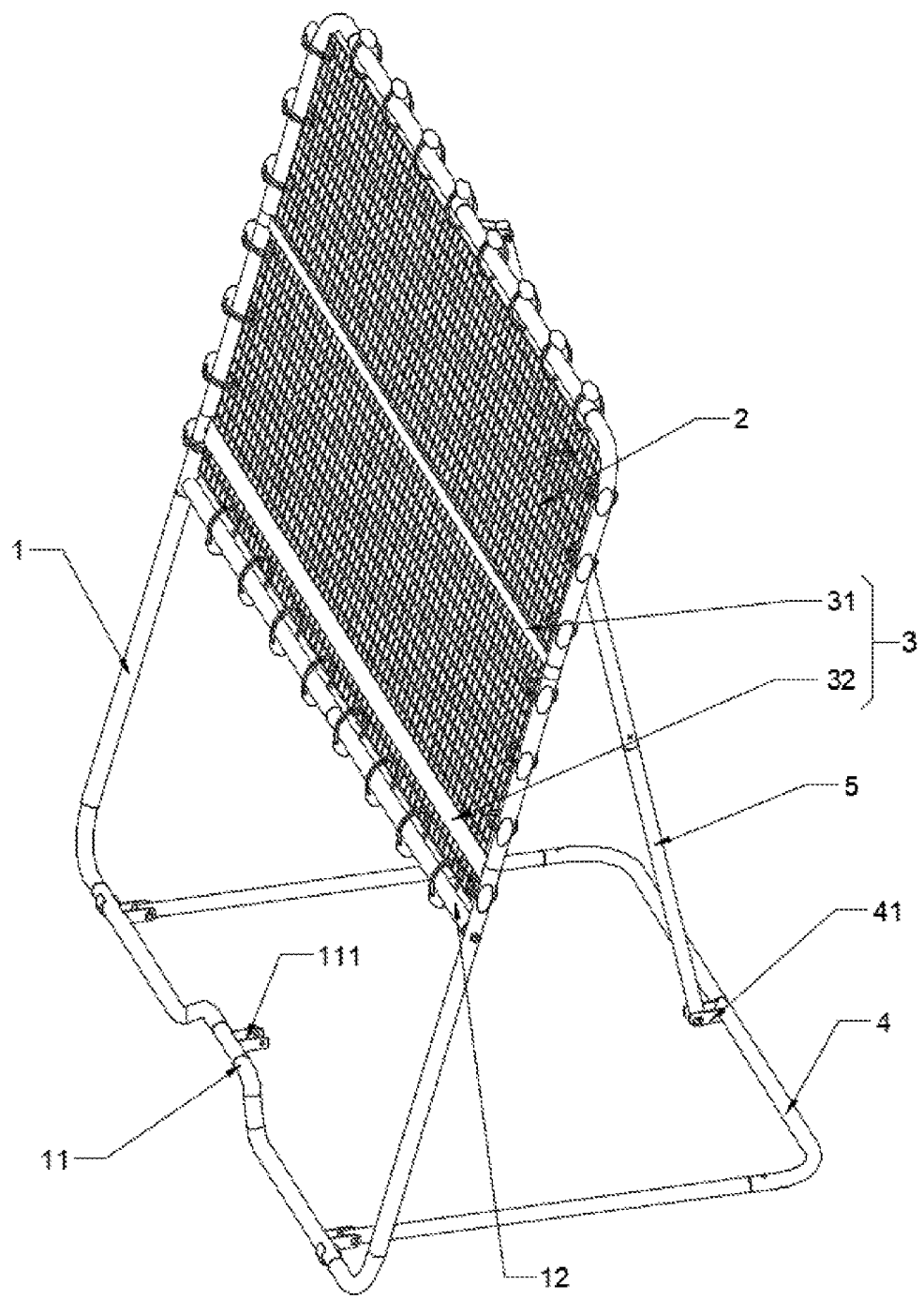
FIG. 1 is a schematic structural view of a pickleball training net according to an embodiment of the disclosure.
Figure 2:
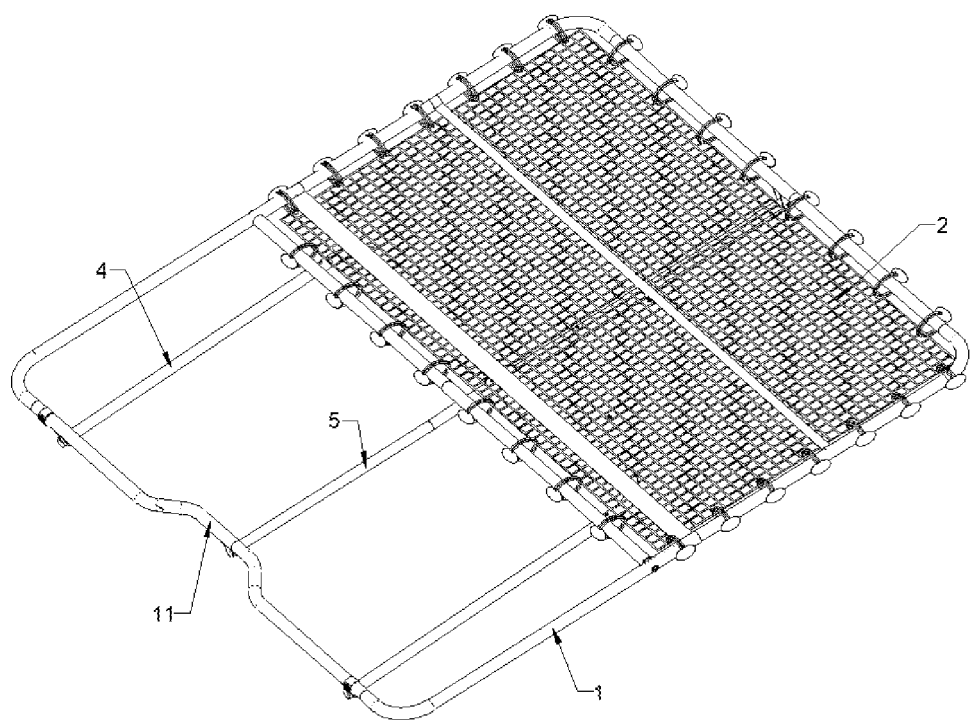
FIG. 2 is another schematic structural view of a pickleball training net according to an embodiment of the disclosure.
Figure 3:
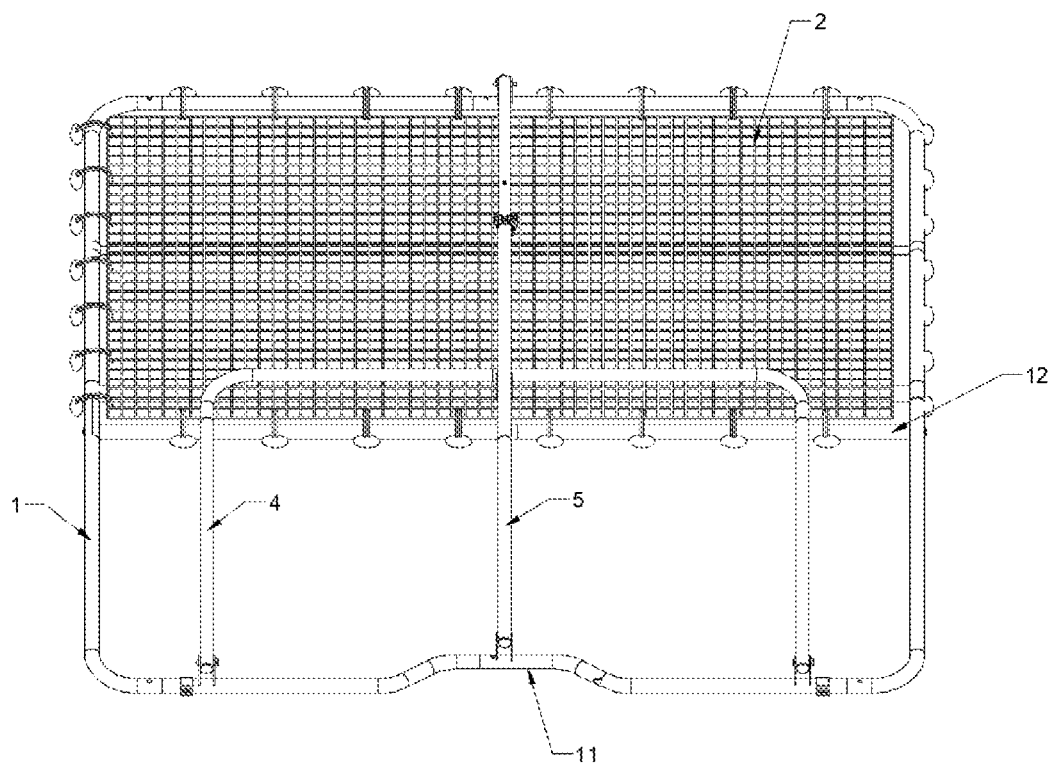
FIG. 3 is a still another schematic structural view of a pickleball training net according to an embodiment of the disclosure.
Figure 4:
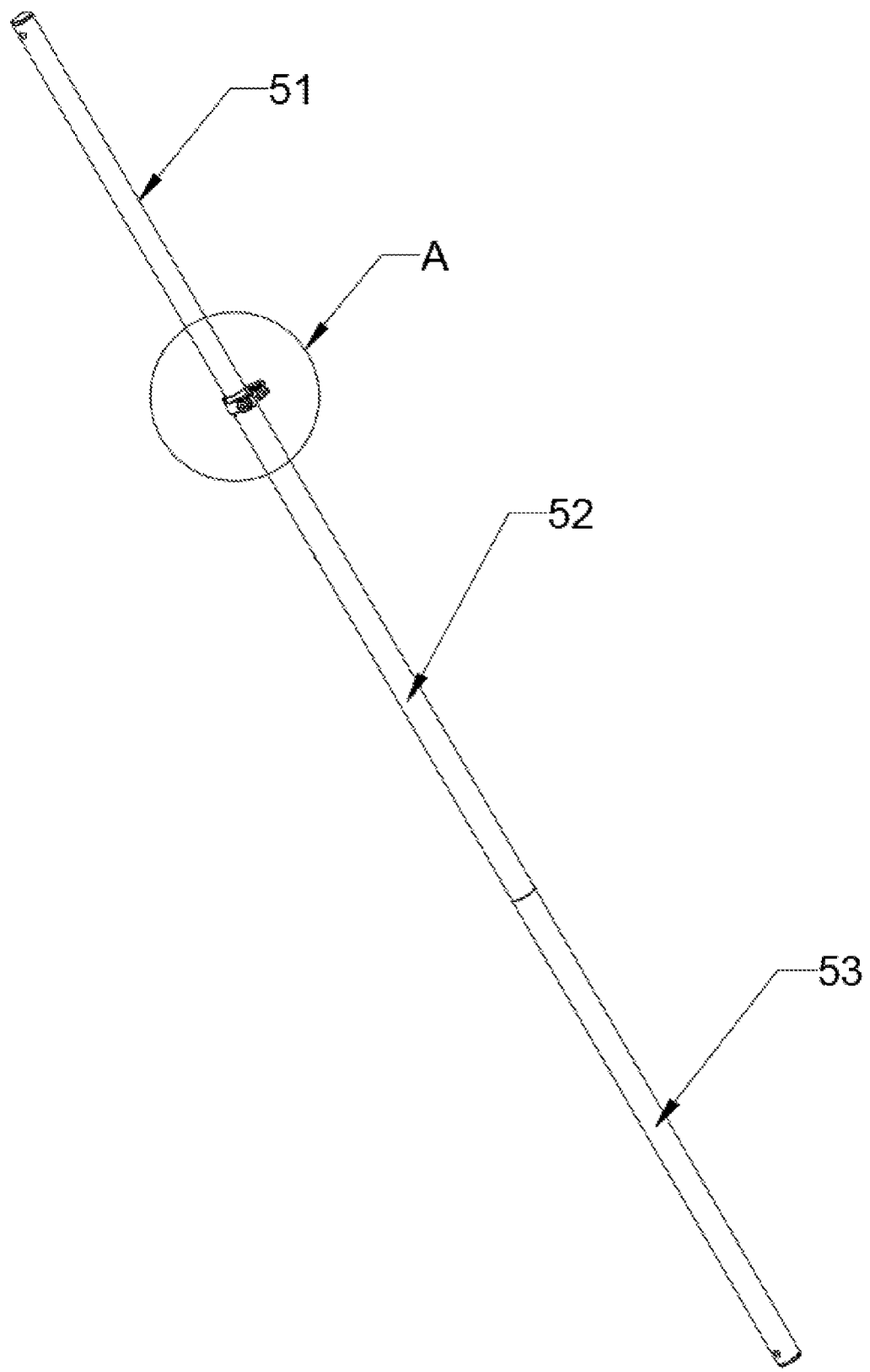
FIG. 4 is a schematic structural view of a support rod according to an embodiment of the disclosure.
Figure 5:
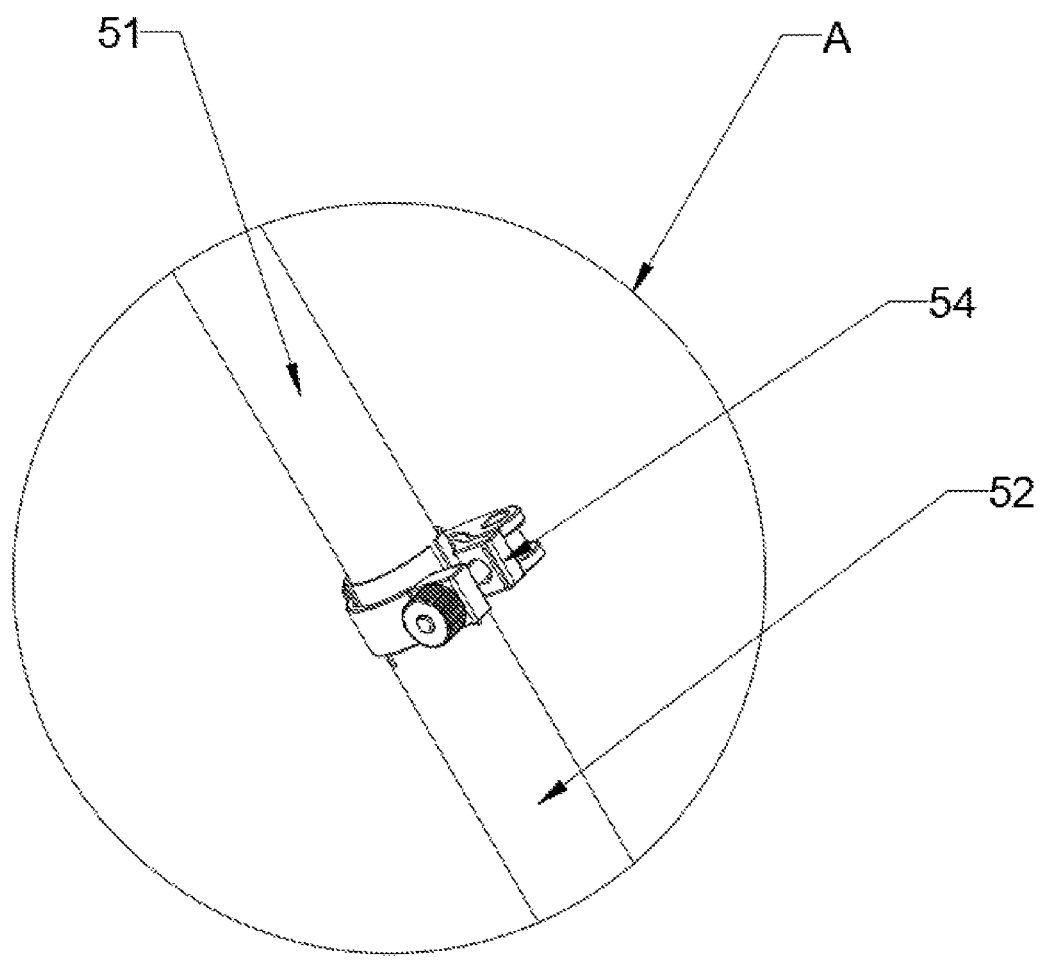
FIG. 5 is an enlarged view of A in FIG. 3.
Figure 6:
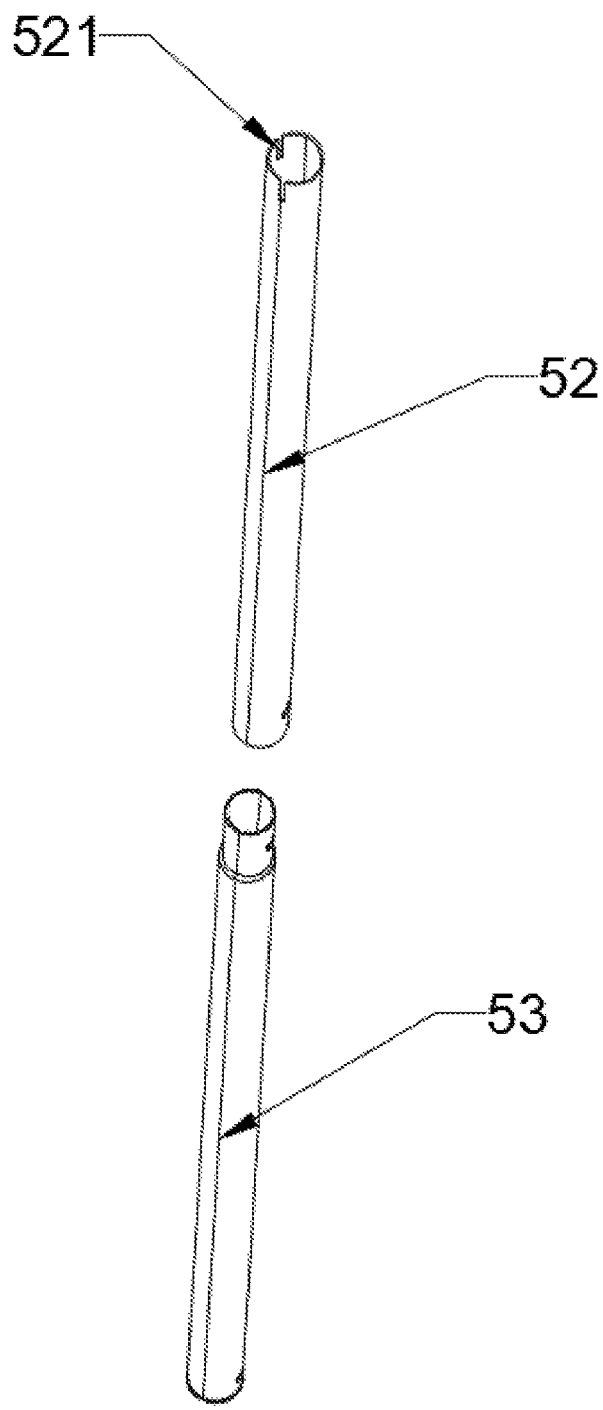
FIG. 6 is a schematic structural view of an inserting section according to an embodiment of the disclosure.

Referring to FIGS. 1 to 6, in an embodiment of the disclosure, a pickleball training net includes: a bracket 1 and a rebound net 2. A cross member 12 is arranged in a middle of the bracket 1, the cross member 12 divides the bracket 1 to form an upper half area and a lower half area, a height of the cross member 12 is less than 910 mm, specifically, a distance from the cross member 12 to a bottom of the bracket 1 is less than 910 mm (lower than a height of a traditional pickleball net). Preferably, the height of the cross member 12 is about 840 mm, the rebound net 2 is arranged in the upper half area of the bracket 1, the bracket 1 is provided with a plurality of hooks to fix the rebound net 2, the rebound net 2 is provided with an identification tape 3, the identification tape 3 divides an optimal rebound area in a middle section of the rebound network 2. There are grids on the rebound net 2, a size of each the grid is within 1.5 inches, and the line diameter of the rebound net 2 is less than 1.5 mm.

The pickleball training net further includes a support rod 4 and a fixing rod 5. The support rod 4 is hinged with a back of the bracket 1, the fixing rod 5 is connected between the bracket 1 and the support rod 4, and the fixing rod 5, the bracket 1 and the support rod 4 form a triangular structure.

In an embodiment, the fixing rod 5 includes an adjusting section 51, a connecting section 52 and an inserting section 53. One end of the adjusting section 51 and one end of the inserting section 53 are respectively detachably inserted into two ends of the connecting section 52, the other end of the adjusting section 51 is hinged with the top end of the bracket 1, and the other end of the inserting section 53 is hinged with the support rod 4.

The connecting section 52 is tubular, and a plurality of gaps 521 are annularly formed on a nozzle of the connecting section 52, and the nozzle of the connection section 52 is sleeved with a fastening ring 54. When the adjusting section 51 is inserted into the connecting section 52, the adjusting section 51 can be fixed by the fastening ring 54.

The two ends of the identification tape 3 are bound on the bracket 1 and the height of the identification tape 3 can be adjusted up and down along the bracket 1, and a surface color of the indication tape 3 is red. The indication tape 3 includes an upper identification tape 31 and a lower identification tape 32, and the upper identification tape 31 and the lower identification tape 32 are arranged in parallel. The two ends of the upper identification tape 31 and the two ends of the lower identification tape 32 are respectively connected with the bracket 1 and enclose an optimal rebound area, and the lower identification tape 32 is generally adjusted to be close to the height of a court net.

In an embodiment, the support rod 4 is provided with a first hinging base 41, a center of a bottom surface of the bracket 1 is bent upward to form a protruding portion 11, the protruding portion 11 is provided with a second hinging base 111, and the inserting section 53 is detachably connected to the first hinging base 41 or the second hinging base 111, that is, when the inserting section 53 is connected to the first hinging base 41, the bracket 1 and the support rod 4 are in an open state, and when the inserting section 53 is connected to the second hinging base 111, the bracket 1 and the support rod 4 are in a retracted state. In addition, the protruding portion 11 is designed for a support rod which is arranged in the middle on the field of pickleball court, which is conductive to placing the bracket 1.

For those skilled in the art, it is obvious that the disclosure is not limited to the details of the above exemplary embodiments, and can be realized in other specific forms without departing from the spirit or basic features of the disclosure. Therefore, from any point of view, the embodiments should be regarded as exemplary and non-restrictive. The scope of the disclosure is defined by the appended claims rather than the above description. Therefore, it is intended to include all changes within the meaning and scope of the equivalent elements of the claims in the disclosure.

What is claimed is:

1. A pickleball training net, comprising: a bracket and a rebound net;
   wherein a cross member is arranged in a middle of the bracket, and divides the bracket to form an upper half area and a lower half area; the rebound net is arranged in the upper half area of the bracket, the bracket is provided with a plurality of hooks to fix the rebound net; and the rebound net is provided with an identification tape, a middle section of the rebound net is divided into a rebound area by the identification tape;
   wherein the pickleball training net further comprises:
   a support rod, wherein the support rod is U-shaped, two ends of the support rod are hinged to a bottom of the bracket, and a middle of the support rod is provided with a first hinging base thereon; and a center of the bottom of the bracket is bent upwards to form a protruding portion, and the protruding portion is provided with a second hinging base thereon; and
   a fixing rod, wherein an end of the fixing rod is connected to a top of the bracket, the other end of the fixing rod is detachably connected with one of the first hinging base and the second hinging base, the pickleball training net is in an unfolded state when the other end of the fixing rod is connected with the first hinging base, and the pickleball training net is in a folded state when the other end of the fixing rod is connected with the second hinging base.

2. The pickleball training net according to claim 1, wherein a height of the cross member is less than 910 millimeters (mm).

3. The pickleball training net according to claim 1, wherein the fixing rod, the bracket and the support rod form a triangular structure.

4. The pickleball training net according to claim 3, wherein the fixing rod comprises an adjusting section, a connecting section and an inserting section; the adjusting section and the inserting section are detachably inserted into two ends of the connecting section, the other end of the adjusting section is hinged with the top of the bracket, and the other end of the inserting section is detachably connected with the one of the first hinging base and the second hinging base.

5. The pickleball training net according to claim 4, wherein the connecting section is tubular, a nozzle of the connecting section is annularly provided with a plurality of gaps and is sleeved with a fastening ring, and when the adjusting section is inserted into the connecting section, the adjusting section is fixed to the connecting section by the fastening ring.

6. The pickleball training net according to claim 1, wherein the identification tape comprises an upper identification tape and a lower identification tape, the upper identification tape and the lower identification tape are arranged in parallel, and two ends of the upper identification tape and two ends of the lower identification tape are respectively connected with the bracket to define the rebound area.

7. The pickleball training net according to claim 6, wherein the rebound area defined between the upper identification tape and the lower identification tape is an optimal rebound area relative to other rebound areas of the rebound net.

8. The pickleball training net according to claim 1, wherein two ends of the identification tape are bound on the bracket and a height of the identification tape is capable to be adjusted up and down along the bracket.

9. The pickleball training net according to claim 1, wherein the first hinging base extends from the support rod towards the second hinging base and the second hinging base extends from the protruding portion of the bracket towards the first hinging base, when the pickleball training net is in the unfolded state.

10. A pickleball training net, comprising:
- a bracket, having a top side, a bottom side, a left side and a right side; wherein a center of the bottom side of the bracket is bent upwards to form a protruding portion, and the protruding portion is provided with a hinging base thereon;
- a cross member, located at a middle of the bracket, wherein two ends of the cross member are respectively connected to the left and right sides of the bracket to define an upper half area and a lower half area with the bracket;
- a rebound net, located in the upper half area and fixedly connected to the bracket and the cross member;
- two identification tapes, located in the upper half area, wherein two ends of each of the two identification tapes are respectively connected to the left and right sides of the bracket to define a plurality of rebound areas on the rebound net; and one, between the two identification tapes, of the plurality of rebound areas is an optimal rebound area compared with other rebound areas of the plurality of rebound areas;
- a U-shaped support rod, wherein two ends of the U-shaped support rod are hinged to the bottom side of the bracket, a middle of the support rod is provided with a hinging base thereon; and
- a fixing rod, wherein an end of the fixing rod is connected to the top side of the bracket, and the other end of the fixing rod is detachably connected with one of the hinging base of the support rod and the hinging base of the bracket, the pickleball training net is in the unfolded state when the other end of the fixing rod is connected with the hinging base of the support rod, and the pickleball training net is in a folded state when the other end of the fixing rod is detachably connected with the hinging base of the bracket.

* * * * *